United States Patent
Monnerat

(10) Patent No.: US 7,646,338 B2
(45) Date of Patent: Jan. 12, 2010

(54) METHOD OF OPTIMIZATION OF PROCESSING OF LOCATION DATA IN THE PRESENCE OF A PLURALITY OF SATELLITE POSITIONING CONSTELLATIONS

(75) Inventor: Michel Monnerat, L'Union (FR)

(73) Assignee: Alcatel Lucent, Paris (FR)

( * ) Notice: Subject to any disclaimer, the term of this patent is extended or adjusted under 35 U.S.C. 154(b) by 151 days.

(21) Appl. No.: 11/617,072

(22) Filed: Dec. 28, 2006

(65) Prior Publication Data

US 2007/0236387 A1 Oct. 11, 2007

(30) Foreign Application Priority Data

Dec. 29, 2005 (EP) .................................. 05301124

(51) Int. Cl.
*G01S 1/00* (2006.01)
(52) U.S. Cl. .............................................. 342/357.15
(58) Field of Classification Search ................. 342/356, 342/357.01–357.17
See application file for complete search history.

(56) References Cited

U.S. PATENT DOCUMENTS

| 5,923,287 A | 7/1999 | Lennen |
| 7,095,368 B1* | 8/2006 | van Diggelen ......... 342/357.01 |
| 2003/0231132 A1 | 12/2003 | Park |
| 2008/0191933 A1* | 8/2008 | Wigren et al. ............ 342/357.1 |

FOREIGN PATENT DOCUMENTS

EP 1 571 460 A 9/2005

* cited by examiner

*Primary Examiner*—Thomas H Tarcza
*Assistant Examiner*—Nga X Nguyen
(74) *Attorney, Agent, or Firm*—Fay Sharpe LLP

(57) ABSTRACT

The present invention concerns a method of optimization of processing of signals from satellite positioning systems in the case where at least two satellite systems cohabit and are utilized to obtain the position of a receiver.

One of the systems is given preference on the basis of a criterion of performance and the satellites of the other systems are eliminated that are situated at an azimuth/elevation angle difference less than a threshold relative to the satellites of the preferred system.

16 Claims, 6 Drawing Sheets

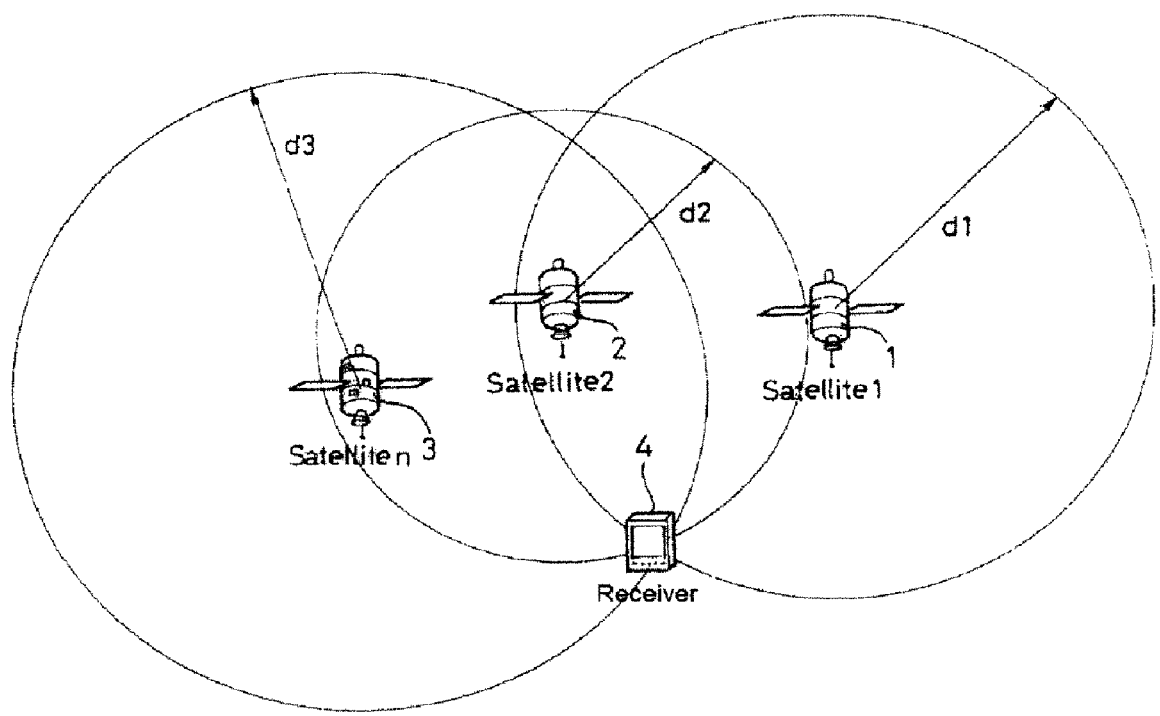
FIG_1

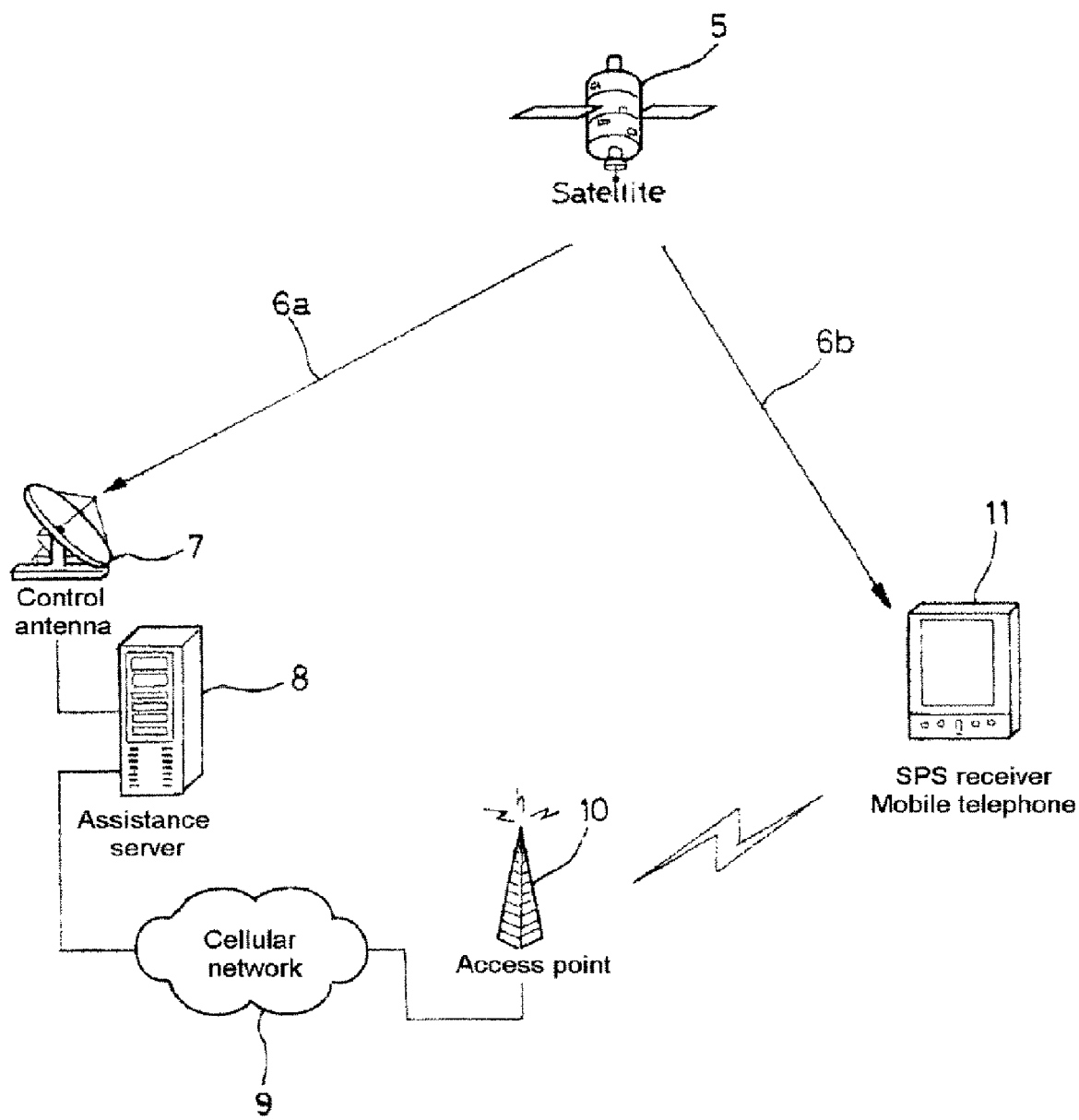

FIG_3
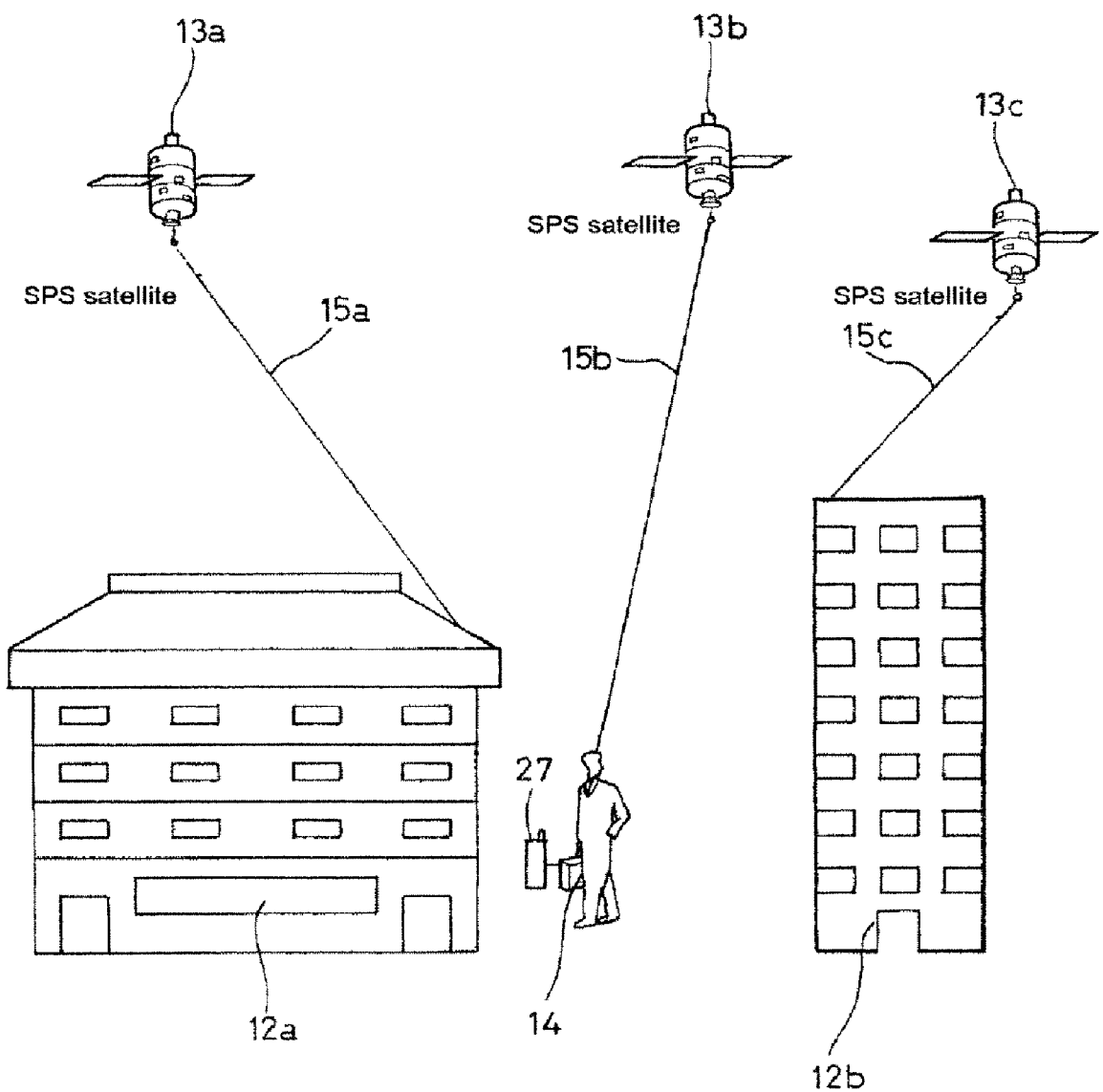

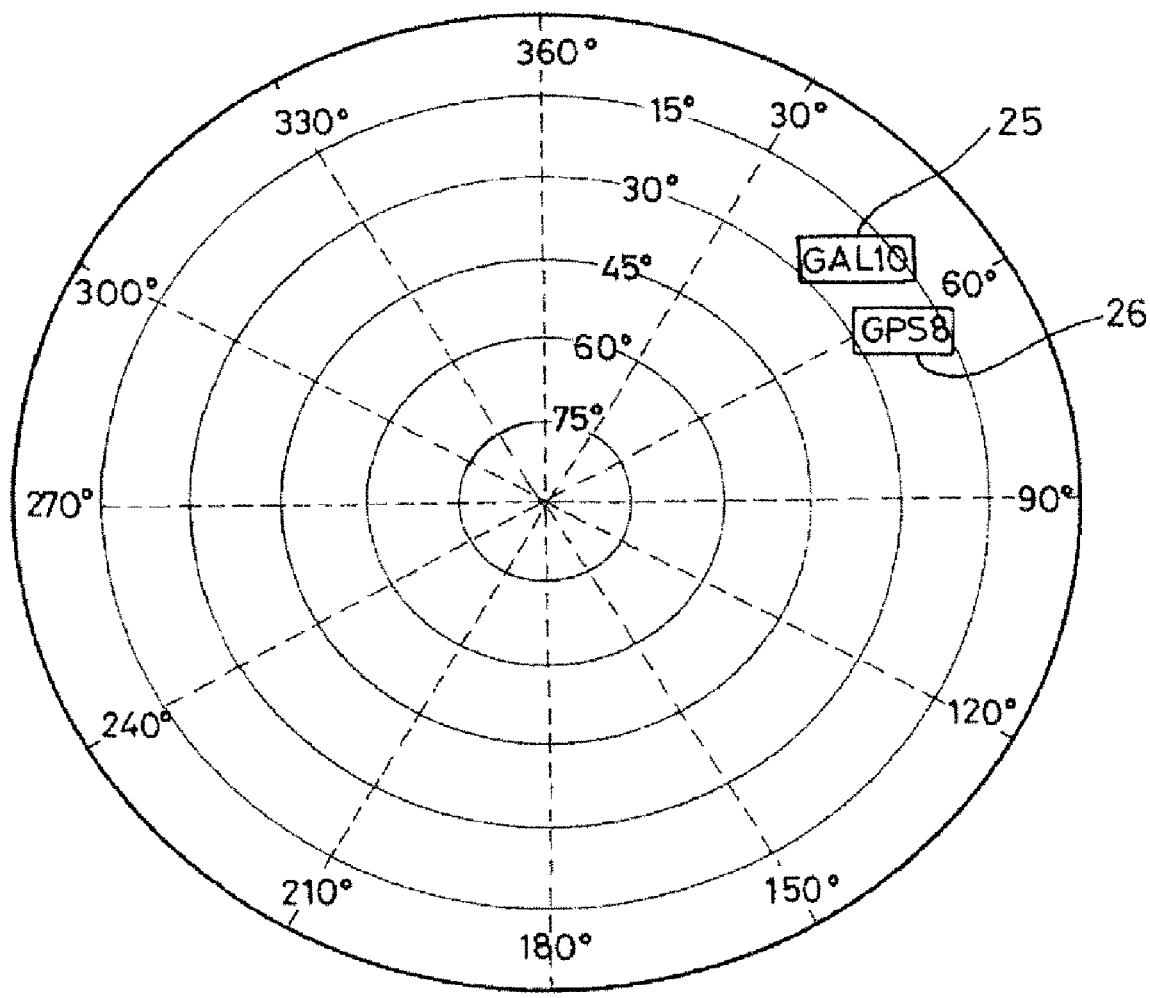
FIG_4

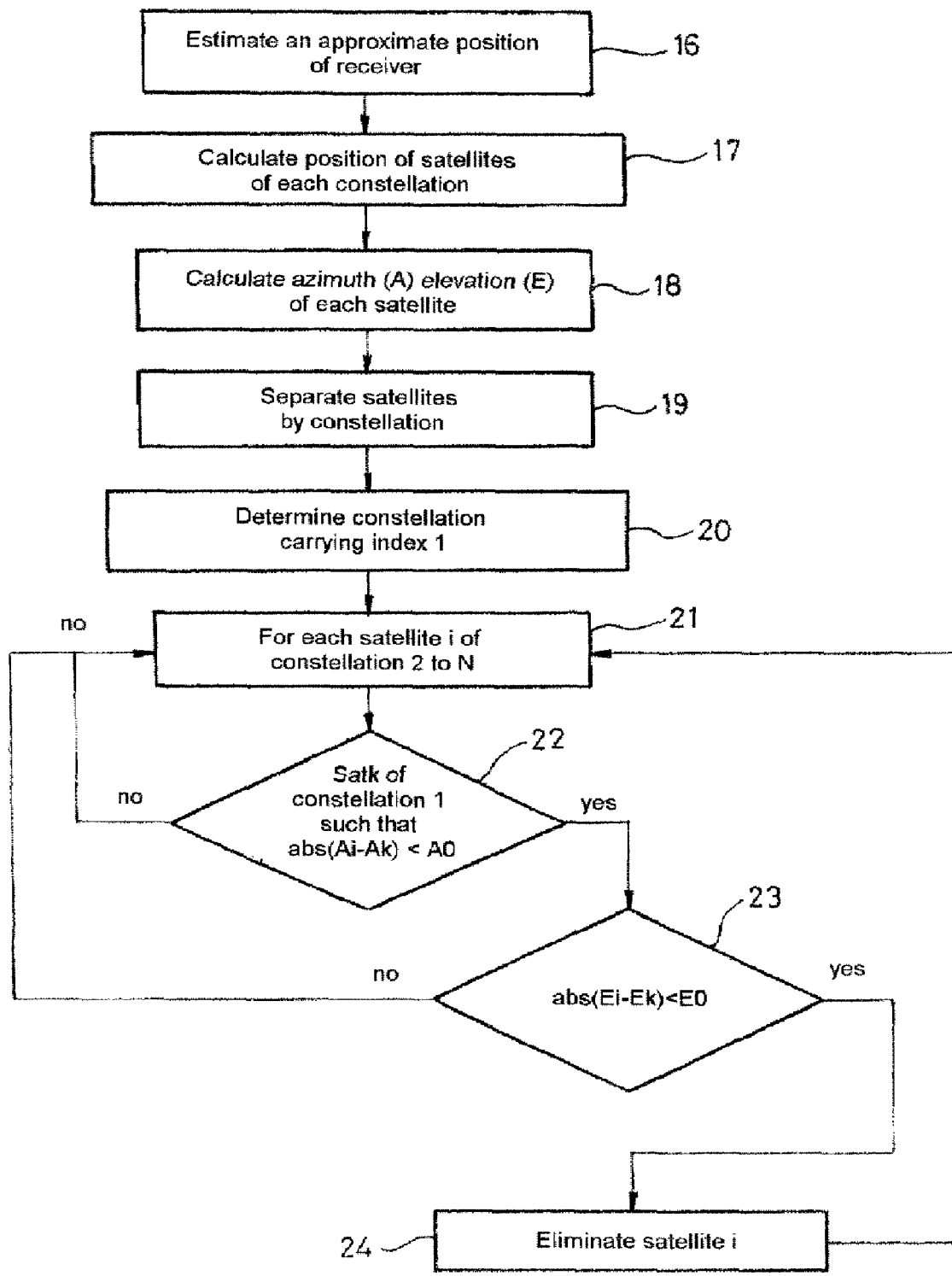

FIG_6
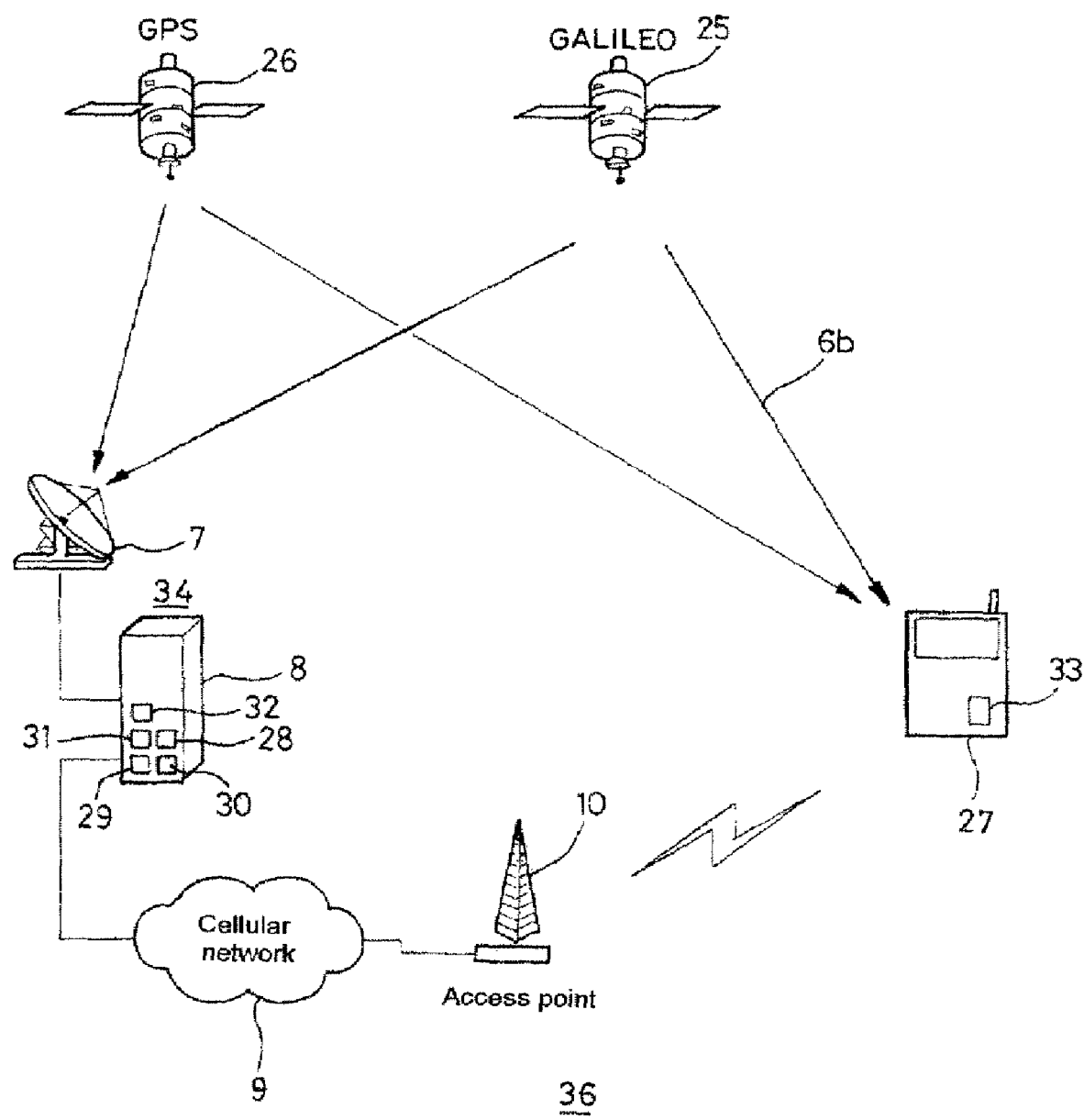

METHOD OF OPTIMIZATION OF PROCESSING OF LOCATION DATA IN THE PRESENCE OF A PLURALITY OF SATELLITE POSITIONING CONSTELLATIONS

The present invention concerns a method of optimizing processing of signals from satellite positioning systems in the case where two satellite systems cohabit and are used. Satellite positioning system means systems of GPS (Global Positioning System), Galileo or Glonass type.

In a satellite positioning system utilizing GNSS (Global Navigation Satellite System) type receivers such as a GPS or Galileo receiver, the data signals enabling the receiver to calculate its position come from different satellites (at least four to determine the four unknowns x, y, z and t). It is well known by the man skilled in the art that positioning by such a system presupposes two types of processing in the receiver.

The first consists in acquiring the signal coming from at least four satellites, the second consists in evaluating the distance separating the receiver from the satellites from which the signal has been received. The interface between a radio navigation satellite system (RNSS) and the user receiver relies on a radio signal itself relying on a spread spectrum technique well known to the man skilled in the art. Spread spectrum techniques, in their most routine form such as the C/A code GPS, F/Nav Galileo, rely on the use of a periodic pseudo-random code. In the context of the GPS, that code has a period of 1 millisecond (ms). This code is added to a digital navigation message, that message including a certain number of items of information necessary for the calculation of the position of the receiver, typically:
  a time reference, well known in GPS under the name TOW (Time of Week) corresponding to the time of sending of the message,
  the position of the satellite at the time of the sending of the message, well known in GPS under the name ephemeredes,
  certain corrections to be made to the onboard clock of the satellite, well known in GPS under the name clock corrections, aiming to correct the time reference relative to the global clock of the system,
  certain propagation correction parameters, such as parameters for correction of the propagation speed of electromagnetic waves in the layers of the atmosphere (in particular the ionosphere),
  the approximate position of the other satellites of the constellation via data known as almanacs.

The data bit rate is of course lower than the periodic spreading code bit rate. In the GPS SPS (GPS Satellite Positioning System) signal, the data bit rate typically rises to 50 bits per second, whereas that of the code is 1.023 million chips per second. A complete code being constituted of 1023 chips (i.e. 1 ms). All of the data added modulo 2 to the spreading code is transmitted on a carrier. In GPS, the carrier is typically at 1.57542 GHz.

The determination of the position of the receiver is represented in FIG. 1. The principle consists in a receiver [4] determining the distance separating it from at least three satellites of the constellation referenced by satellites [1], [2] and [3] (three satellites for location in two dimensions and four satellites for location in three dimensions). Once these distances [d1], [d2] and [d3] have been determined, the receiver can determine its position at the intersection of the spheres whose center is the position of each of the satellites themselves and whose radius is given by the distance [di]. The distance measurement is effected by measuring the time of arrival of a radio signal coming from the satellite. It follows that the essential information coming from the satellite via the navigation message that the receiver must process consists of the pair (sending TOW, position of the satellite at the time of sending). The satellite transmits in its navigation message its ephemeredes (Keplerian parameters) enabling the receiver to calculate the position of the satellite in a frame of reference linked to the Earth. In the GPS case the ephemeredes consist of 16 parameters.

| | |
|---|---|
| M0 | Mean anomaly |
| Dn | Mean displacement |
| E | Eccentricity |
| $(A)^{1/2}$ | Root of half major axis |
| OMEGA 0 | Longitude of ascending node |
| I0 | Inclination |
| W | Argument of perigee |
| OMEGA DOT | Time derivative of right ascension |
| I DOT | Time derivative of inclination |
| Cuc | Cosine amplitude of harmonic of latitude argument correction term |
| Cus | Sine amplitude of harmonic of latitude argument correction term |
| Crc | Cosine amplitude of harmonic of orbit radius correction term |
| Crs | Sine amplitude of harmonic of orbit radius correction term |
| Cic | Cosine amplitude of harmonic of inclination angle correction term |
| Cis | Sine amplitude of harmonic of inclination angle correction term |

These parameters are repeated every 30 seconds in the navigation message.

The position of the satellite being obtained, it remains for the receiver to detect the time of sending of the message in order to deduce the propagation time of the wave and then the distance separating it from the satellite, and thus the radius of one of the three necessary spheres. As indicated hereinabove, the time also forms part of the content of the navigation message broadcast by the satellite. That time is repeated every 6 seconds. However, it is necessary to apply a satellite clock correction to the time read in the navigation message in order to transpose the transmitted time into a system reference common to all the satellites. This correction is transmitted every 30 seconds.

In conclusion, it is clearly apparent that a receiver can be in a position to determine its position only at the end of a minimum time of 30 seconds after having acquired the signal. The acquisition of the signal means the whole of the first operation to be effected by the receiver, which enables it to be synchronized in frequency and in time to the bit streams transmitted, an essential phase for the demodulation of the navigation message. For the receiver, acquisition consists in effecting a time-frequency search of the energy of the signal coming from the satellite. Locking onto the frequency of the signal from the satellite consists for the receiver in being tuned to the frequency at which the signal from the satellite is received. The receiver has three uncertainties leading it to effect this search:
  Doppler effect linked to the mobility of the satellite,
  Doppler effect linked to the mobility of the user,
  uncertainty linked to the accuracy of the receiver clock.

For the receiver, time locking consists in identifying a code transition in the received signal. The spreading code in the case of the GPS being periodic with a period of 1 ms, the time search is effected with a 1 ms horizon. Once the code transition has been identified, the man skilled in the art knows how to identify a bit transition and then the frame synchronization broadcast in the navigation message.

This time-frequency search is very costly in terms of receiver complexity and limits commensurately the performance of the receiver.

To summarize, the time taken by a receiver to provide a first position is constrained by a very costly first phase of seeking time-frequency synchronization and also by the reading of basic information in the navigation signal (greater than 30 s).

The method known to the man skilled in the art for alleviating this problem is known as Assisted GPS or Assisted GNSS. This method consists in coupling a cellular telecommunication system and a satellite navigation signal receiver. This method is described in FIG. 2. It assumes that the satellite navigation signal receiver is coupled to a cellular telecommunication receiver (terminal) [11]. A network equipment commonly called the assistance data server [8] listens continuously to the satellites of the satellite constellation via a radio signal [6a] and a control antenna referenced [7]. The information from the navigation message from each satellite is then stored by the server [8]. When the receiver [11] is searching for its position, it requests a certain number of items of assistance data by means of a call via a base station [10] of the cellular network [9] to the assistance data server. The assistance data is then returned by the server [8] to the receiver [11] via the base station [10]. This assistance data facilitates the processing of the signal [6b] received by the receiver [11] coming from the satellite [5] and confers on the receiver performance that is enhanced, inter alia, in terms of calculation time. In fact, the assistance data may be of the following type:

Content of the navigation message broadcast in the signals [6b] and [6a]. The content is returned at a bit rate much higher than the bit rate of the navigation message. The time taken to route the data essential to the determination of the position is therefore changed from 30 seconds to 1 to 2 seconds.

Pre-location of the receiver [11]. In fact, the receiver [11] being connected to the base station [10], the server [8] is in a position to know that the receiver is in the vicinity of the base station [10]. In a GSM type network, the dimension of the cells is typically less than 35 km.

A time reference. The server [8] receiving the data from the satellite [5] is in a position to know the satellite system time and therefore to broadcast it to the receiver [11]. Most cellular communication networks being asynchronous, the time reference transmitted can achieve an accuracy only of the order of 2 to 3 seconds.

Different types of corrections: propagation speed corrections, satellite onboard clock correction, local propagation correction, etc.

The knowledge of a pre-location, of the ephemeredes of the satellites and of an approximate time reference enables the receiver to calculate the Doppler effect of the satellites in view, greatly reducing the uncertainty in terms of frequency to be swept during the acquisition phase. Similarly, the ephemeredes of the satellites being known via the call to the server [8], it becomes unnecessary for the receiver [11] to demodulate this data in the navigation message [6b], which eliminates the constraint of 30 seconds previously highlighted for calculating the position. It then suffices for the receiver to determine a time event in the signal [6b] from the satellite, in other words to find the spreading code transition and then the transmitted time, the TOW in the GPS signal which recurs every 6 seconds. There is therefore clearly a significant improvement in performance, as much with regard to the time necessary for the calculation of a location point as with regard to the sensitivity. Sensitivity means the minimum power of the signal received by the receiver enabling it to perform adequate processing.

The assistance example is provided in a GSM type cellular network, it goes without saying that it may be extended to other systems such as WIFI, WIMAX type systems.

The drawback of such a system, as explained hereinabove, lies in the quantity of assistance data to be transmitted over the cellular network for each user. It is therefore necessary to adopt strict and efficient coding for the broadcasting of the data. This is precisely the object of the definition of the technical specifications of the 3GPP standard TS 44.031 aimed at an optimum definition of the content and coding of the assistance data.

The accuracy and the availability of the location function provided by such a system depend directly on the geometry of the constellation of satellites seen from the receiver, and consequently on the blocking conditions linked to the environment in which the user is moving around. This impact of the geometry is well known to the man skilled in the art and is reflected in the form of a dilution of precision (DOP) coefficient.

In an urban environment, of "urban canyon" type, as represented in FIG. 3, the transceiver (mobile terminal) [27] of the user [14] seeking to determine his position by means of satellites [13a], [13b], [13c] attempts to acquire the signals [15a], [15b], [15c]. Because of the obstacles represented by the buildings [12a] and [12b], the signals [15a] and [15c] are unable to reach the terminal [27] of the user [14], which is therefore constrained to use only the signal [15b] from the satellite [13b]. The geometry of the set of satellites used to calculate the position of the terminal is affected (in the example illustrated in FIG. 3, the situation is extreme, since only one satellite remains visible from the terminal, making the calculation of the position impossible).

To alleviate these problems of large obstacles in the urban environment, the Research & Development teams of the Applicant have been the first to come up with the idea of considering the conjoint use of the satellites of the GPS and Galileo constellations. The GPS constellation nominally contains 24 satellites. The Galileo constellation contains 30 of them. The conjoint utilization of the satellites of the GPS and Galileo constellation means that the number of satellites usable can be as high as 54 satellites. The conjoint use of a plurality of constellations is therefore favorable to utilization in towns or in environments featuring serious blocking conditions. Note that the multiplicity of satellites increases the probability of a high number of visible satellites for given blocking conditions.

However, utilization of a plurality of constellations in turn has several drawbacks:

the increased number of satellites increases automatically the complexity of the processing at the level of the terminal receiver, the increased number of satellites also increases automatically the quantity of assistance data transmitted by an assistance server in an Assisted GNSS system.

The present invention proposes a method authorizing the benefit of the multiplicity of constellations at the same time as eliminating the negative effects listed hereinabove.

To this end, the invention consists in a method of management of positioning satellite signals coming from a first constellation of satellites of a first satellite location system for locating a mobile terminal of a cellular communication network capable of exchanging satellite signals of satellite location systems, characterized in that, positioning satellite signals coming from at least one second constellation of satellites of a second satellite location system, said method comprises the following steps:
- a step of determination of an approximate pre-location of the terminal,
- a step of estimation of the position of the satellites of said first and second constellations,
- a step of resolution of the list of satellites visible from the terminal as a function of the approximate pre-location of the terminal that has been determined and from the estimated position of the satellites,
- a step of calculation of the elevation and the azimuth of each satellite from the list of satellites visible from the terminal as a function of the approximate position of the terminal,
- a step of sorting of the satellites from the list of visible satellites by:
  - giving preference to one of said satellite constellations on the basis of a performance criterion,
  - excluding from the list of visible satellites all of the satellites belonging to the constellations other than the preferred constellation and the position whereof in azimuth and in elevation from the point of view of the terminal is confined within a predetermined angular range relative to one of the satellites of the preferred constellation.

In one embodiment the qualification of the constellation as the preferred constellation is effected by the construction of N groups of satellites belonging to the list of satellites visible from the terminal, where N corresponds to the number of satellite positioning constellations used in the calculation of the position of the user, a group of satellites being defined in that all the satellites of the same group belong to the same constellation, the constellation assuming the preferred quality with an index 1 being considered in that the physical characteristics of the signals coming from the latter are more favorable to positioning performance.

In one embodiment the step of sorting of the satellites and exclusion, for each satellite $Sat_i$ of the constellation 2 to N, utilizes the following phases:
- calculation of the angular difference between the azimuth of the satellite $Sat_i$ and the azimuth of all of the satellites of the constellation 1,
- calculation of the angular difference between the elevation of the satellite $Sat_i$ and the elevation of all of the satellites of the constellation 1,
- elimination of the satellite $Sat_i$ from the list of satellites visible from the position of the terminal if the elevation and azimuth angular differences are less than a respective given value.

In one embodiment the step of determination of an approximate pre-location of the terminal utilizes either the result of a triangulation within the cellular communication network to deduce the pre-location therefrom, or location information coming from the position of a base station of the cell in which the terminal is situated.

In one embodiment the step of determination of an approximate pre-location of the terminal utilizes an earlier pre-location of the terminal.

In one embodiment the method comprises a step of processing by the terminal of satellite signals from each satellite from the list of visible satellites, minus those that have been excluded.

The invention also consists in a system for management of positioning satellite signals coming from a first constellation of satellites of a first satellite location system for locating a mobile terminal of a cellular communication network capable of exchanging satellite signals of satellite location systems, characterized in that, positioning satellite signals coming from at least one second constellation of satellites of a second satellite location system, said management system comprises:
- means for determination of an approximate pre-location of the terminal,
- means for estimation of the position of the satellites of said first and second constellations,
- means for resolution of the list of satellites visible from the terminal as a function of the approximate pre-location of the terminal that has been determined and from the estimated position of the satellites,
- means for calculation of the elevation and the azimuth of each satellite from the list of satellites visible from the terminal as a function of the approximate pre-location of the terminal,
- means for sorting of the satellites from the list of visible satellites by:
  - giving preference to one of said satellite constellations on the basis of a performance criterion,
  - excluding from the list of visible satellites all of the satellites belonging to the constellations other than the preferred constellation and the position whereof in azimuth and in elevation from the point of view of the terminal is confined within a predetermined angular range relative to one of the satellites of the preferred constellation.
- means for transmission to the terminal of assistance data relating to the list of satellites visible from the terminal, minus the excluded satellites.

In one embodiment the system comprises an assistance data server that integrates said means for determination of an approximate pre-location of the terminal, said means for estimation of the position of the satellites of said first and second constellations, said means for resolution of the list of satellites visible from the terminal as a function of the approximate pre-location of the terminal that has been determined and the estimated position of the satellites, said means for calculation of the elevation and the azimuth of each satellite from the list of satellites visible from the terminal as a function of the approximate pre-location of the terminal, said means for sorting the satellites from the list of visible satellites, and means for transmission to the terminal of assistance data relating to the list of satellites visible from the terminal, minus the excluded satellites.

Other features and advantages of the invention will become more clearly apparent on reading the following description of nonlimiting particular embodiments of the invention with reference to the following figures:

FIG. 1, already described, represents the known method of determination of the position of a receiver by GPS, FIG. 2, already described, represents the known method of location by Assisted GPS or Assisted GNSS, FIG. 3 represents a known method of location by satellites in an urban environment, FIG. 4 represents a satellite of the GPS constellation close to a satellite of the Galileo constellation, FIG. 5 is a diagram representing the steps of one embodiment of the method of the invention, FIG. 6 represents a management system according to one embodiment of the invention.

The elements fulfilling identical functions carry the same references throughout the various figures.

In an embodiment shown in FIG. 5, the method according to the invention comprises the following steps:
- Establishing [16] an approximate pre-location of the terminal. This approximate pre-location may be deduced by the utilization of an Assisted GNSS method in which the location system deduces the approximate position of the cell in which the terminal is moving around. It may equally be deduced from an earlier location of the terminal, Estimating [17] the position of the satellites of each constellation (GPS and Galileo for example), Deducing, from said approximate position of the terminal and from said position of the satellites, the list of the satellites visible from the terminal, Deducing [18], from the approximate position of the terminal, the elevation and the azimuth of each satellite from the list of satellites visible from the receiver, Sorting the satellites from said list of visible satellites by the following method:

Construction [19] of N groups of satellites belonging to the list of satellites visible from the terminal, where N corresponds to the number of satellite positioning constellations utilized in the calculation of the position of the user. A group of satellites is defined in that all the satellites of the same group belong to the same constellation. The constellation taking the index number 1 being considered in that the physical characteristics of the signals are more favorable to positioning performance [20], Sorting process [21], for each satellite $Sat_i$ of the constellation 2 to N, calculation [22] of the angular difference between the azimuth of the satellite $Sat_i$ and the azimuth of all of the satellites of the constellation 1, calculation [23] of the angular difference between the elevation of the satellite $Sat_i$ and the azimuth of all of the satellites of the constellation 1, if the elevation and azimuth angular differences are less than a given value, elimination [24] of the satellite $Sat_i$ from the list of satellites visible from the position of the terminal. See FIG. 5, in the steps [22], [23] and [24] in which A0 and E0 respectively correspond to an azimuth/elevation separation threshold. The situation represented in FIG. 4 provides the example of a Galileo satellite [25] very close in azimuth and in elevation to a GPS satellite [26].

Processing of the signal from each satellite from the list of visible satellites, minus those that have been eliminated as indicated hereinabove.

The determination of the orientations of the satellites of a constellation of satellites is effected through the knowledge of the almanacs of the constellation or of the ephemeredes of the satellites. It consists in determining the azimuth and the elevation of each satellite. To this end, it is necessary:

1. To determine the position of each satellite, as described in the GPS ICD 200C from the almanacs or the ephemeredes.

2. To determine the elevation of each satellite, as follows $$\begin{cases} \alpha = \dfrac{\pi}{2} - A\cos\left(\dfrac{\dfrac{(X_s - X_u)X_u + (Y_s - Y_u)Y_u}{\sqrt{a^2 - X_u^2 - Y_u^2}}}{\dfrac{(X_u^2 + Y_u^2)[(X_s - X_u)^2 + (Y_s - Y_u)^2]}{\sqrt{(a^2 - X_u^2 - Y_u^2)}}}\right), & \text{if } \phi \geq 0 \\[2em] \alpha = -\dfrac{\pi}{2} + A\cos\left(\dfrac{\dfrac{(X_s - X_u)X_u + (Y_s - Y_u)Y_u}{\sqrt{a^2 - X_u^2 - Y_u^2}}}{\dfrac{(X_u^2 + Y_u^2)[(X_s - X_u)^2 + (Y_s - Y_u)^2]}{\sqrt{(a^2 - X_u^2 - Y_u^2)}}}\right), & \text{if } \phi < 0 \end{cases}$$

where Xs, Ys, Zs are the coordinates of the satellite concerned in a frame of reference linked to the Earth, and where Xu, Yu, Zu are the coordinates of the terminal determined approximately, for example using the WIFI network, $\alpha$ is the elevation of the satellite concerned and $\phi$ is the latitude of the terminal, a=6378137.0 km (half major axis of the Earth),
b=6356752.3142 km (half minor axis of Earth).

3. To determine the azimuth of each satellite, as follows using the same notation:

$$\vec{n}\begin{vmatrix} n_1 = \dfrac{1}{\sqrt{\dfrac{b^2}{a^2}\dfrac{x_u^2 + y_u^2}{a^2 - (x_u^2 + y_u^2)} + 1}} \dfrac{b}{a}\dfrac{x_u}{\sqrt{a^2 - (x_u^2 + y_u^2)}} \\[2em] n_2 = \dfrac{1}{\sqrt{\dfrac{b^2}{a^2}\dfrac{x_u^2 + y_u^2}{a^2 - (x_u^2 + y_u^2)} + 1}} \dfrac{b}{a}\dfrac{y_u}{\sqrt{a^2 - (x_u^2 + y_u^2)}}, \text{ if } \phi_u > 0, \\[2em] n_3 = \dfrac{1}{\sqrt{\dfrac{b^2}{a^2}\dfrac{x_u^2 + y_u^2}{a^2 - (x_u^2 + y_u^2)} + 1}} \end{vmatrix}$$

$$\vec{n}\begin{vmatrix} n_1 = \dfrac{1}{\sqrt{\dfrac{b^2}{a^2}\dfrac{x_u^2 + y_u^2}{a^2 - (x_u^2 + y_u^2)} + 1}} \dfrac{b}{a}\dfrac{x_u}{\sqrt{a^2 - (x_u^2 + y_u^2)}} \\[2em] n_2 = \dfrac{1}{\sqrt{\dfrac{b^2}{a^2}\dfrac{x_u^2 + y_u^2}{a^2 - (x_u^2 + y_u^2)} + 1}} \dfrac{b}{a}\dfrac{y_u}{\sqrt{a^2 - (x_u^2 + y_u^2)}}, \text{ else} \\[2em] n_3 = \dfrac{1}{\sqrt{\dfrac{b^2}{a^2}\dfrac{x_u^2 + y_u^2}{a^2 - (x_u^2 + y_u^2)} + 1}} \end{vmatrix}$$

-continued $$Azimuth = \begin{cases} ACOS\left[\dfrac{(X_s - X_u)v_1 + (Y_s - Y_u)v_2 + (Z_s - Z_u)v_3}{\sqrt{(X_s - X_u)^2 + (Y_s - Y_u)^2 + (Z_s - Z_u)^2}}\right] & \text{if } (X_s - X_u)u_1 + (Y_s - Y_u)u_2 + (Z_s - Z_u)u_3 \geq 0 \\ 2\pi - ACOS\left[\dfrac{(X_s - X_u)v_1 + (Y_s - Y_u)v_2 + (Z_s - Z_u)v_3}{\sqrt{(X_s - X_u)^2 + (Y_s - Y_u)^2 + (Z_s + Z_u)^2}}\right] & \text{else} \end{cases}$$

The present method has the main advantage of a reduction of the complexity of the method of calculating the position of the terminal, exploiting the following observation:

- failure of reception of a satellite signal is for the most part caused by a blocking effect itself induced by a blocking material obstructing an area defined by a given azimuth-elevation contour from the point of view of the terminal,
- said material blocking the signals coming from the satellites of one of the constellations has a high probability of blocking the signals coming from satellites of another constellation situated in said azimuth-elevation zone,
- the utilization in the positioning calculation of signals coming from satellites confined in a reduced azimuth-elevation zone brings only a very small improvement to the accuracy of the location.

The method according to the invention finds an advantageous application in a system of assistance to the navigation of Assisted GPS/GNSS mobile terminals, as shown in FIG. 6 in one of its embodiments.

This system 36 of assistance to the navigation of Assisted GPS/GNSS mobile terminals comprises the following elements:

- a GNSS assistance data server 34,
- a cellular telecommunication network 9,
- the terminal 27 coupling the transceiver functions compatible with the cellular telecommunication network and with the GNSS satellite positioning system,
- at least two different satellite positioning constellations (GPS and Galileo).

The server 34 comprises:

- means 29 for estimating the position of the satellites of said first and second constellations by way of its control antenna 7,
- means 28 for determining an approximate pre-location of the terminal.

This pre-location may be determined from information coming from said telecommunication network or may, inter alia, come from the position of the base station of the cell in which the terminal is situated.

- means 30 for resolution of the list of satellites visible from the terminal as a function of the approximate pre-location of the terminal that has been determined and from the estimated position of the satellites,
- means 31 for calculation of the elevation and the azimuth of each satellite from the list of satellites visible from the terminal as a function of the approximate pre-location of the terminal,
- means 32 for sorting the satellites from the list of visible satellites by:
  - giving preference to one of said satellite constellations on the basis of a performance criterion,
  - excluding from the list of visible satellites all of the satellites belonging to the constellations other than the preferred constellation and the position whereof in azimuth and in elevation from the point of view of the terminal is confined within a predetermined angular range relative to one of the satellites of the preferred constellation.
- means for transmission to the terminal 27 of assistance data relating to the list of satellites visible from the terminal, minus the excluded satellites. In the present case, the transmission is effected via the cellular network 9 and the access point 10.

The terminal 27 includes means 33 for processing the satellite signals from each satellite from the list of visible satellites, minus those that have been excluded.

It will be noted that the means referenced 28 to 32 are preferably software means executed by a microprocessor not shown.

The present embodiment, in addition to the reduction of complexity of processing in the terminal, reduces the quantity of data transmitted over the cellular telecommunication network.

The invention claimed is:

1. Method of management of positioning satellite signals (15a, 15b, 15c) coming from a first constellation of satellites (GPS, 26) and a second constellation of satellites (Galileo, 25) of a first and a second satellite location system for locating a mobile terminal (27) of a cellular communication network capable of exchanging satellite signals with the first and second satellite location systems (GPS, Assisted GPS, Galileo, Assisted Galileo), said method comprising:

determining an approximate pre-location of the terminal;
   estimating the position of the satellites of said first and second constellations;
   resolving a list of satellites visible from the terminal as a function of the approximate pre-location of the terminal and the estimated position of the satellites;
   calculating the elevation and the azimuth of each satellite from the list of satellites visible from the terminal as a function of the approximate pre-location of the terminal; and
   sorting the satellites from the list of visible satellites by:
   giving preference to one of said satellite constellations on the basis of a performance criterion, excluding (24) from the list of visible satellites all of the satellites belonging to the constellations other than the preferred constellation having positions in azimuth and in elevation from the point of view of the terminal confined within a predetermined angular range relative to one of the satellites of the preferred constellation.

2. Method according to claim 1, characterized in that the qualification of the constellation as the preferred constellation is effected by the construction of N groups of satellites belonging to the list of satellites visible from the terminal, where N corresponds to the number of satellite positioning constellations used in the calculation of the position of the user, a group of satellites being defined in that all the satellites of the same group belong to the same constellation, the preferred constellation assuming a preferred quality index 1 and having physical signal characteristics more favorable to positioning performance.

3. Method according to claim 2, wherein the step of sorting of the satellites, for each satellite $Sat_i$ of the constellations 2 to N, includes:

calculation (22) of the angular difference between the azimuth of the satellite $Sat_i$ and the azimuth of all of the satellites of the constellation 1, calculation (23) of the angular difference between the elevation of the satellite $Sat_i$;

and the elevation of all of the satellites of the constellation 1, elimination (24) of the satellite $Sat_i$ from the list of satellites visible from the position of the terminal if the elevation and azimuth angular differences are less than a respective given value (AO, EO).

4. Method according to claim 1 characterized in that the step (16) of determining an approximate pre-location of the terminal utilizes the result of a triangulation within the cellular communication network to deduce the pre-location therefrom.

5. Method according to claim 1, characterized in that the step (16) of determining an approximate pre-location of the terminal utilizes an earlier pre-location of the terminal.

6. Method according to claim 1, further comprising a step of the mobile terminal processing satellite signals from each satellite from the list of visible satellites, minus those that have been excluded.

7. System for management of positioning satellite signals (15a, 15b, 15c) coming from a first constellation of satellites (GPS, 26) and a second constellation of satellites (Galileo, 25) of a first and a second satellite location system for locating a mobile terminal (27) of a cellular communication network capable of exchanging satellite signals with the first and second satellite location systems (GPS, Assisted GPS, Galileo, Assisted Galileo), characterized in that said management system comprises:

means (28) for determination of an approximate pre-location of the terminal, means (29) for estimation of the position of the satellites of said first and second constellations, means (30) for resolution of the list of satellites visible from the terminal as a function of the approximate pre-location of the terminal that has been determined and from the estimated position of the satellites, means (31) for calculation of the elevation and the azimuth of each satellite from the list of satellites visible from the terminal as a function of the approximate pre-location of the terminal, means (32) for sorting of the satellites from the list of visible satellites by: giving preference to one of said satellite constellations on the basis of a performance criterion, excluding from the list of visible satellites all of the satellites belonging to the constellations other than the preferred constellation having positions in azimuth and in elevation from the point of view of the terminal confined within a predetermined angular range relative to one of the satellites of the preferred constellation, and means (9, 10) for transmission to the terminal (27) of assistance data relating to the list of satellites visible from the terminal, minus the excluded satellites.

8. System according to claim 7, characterized in that the system comprises an assistance data server (34) that integrates said means (28) for determination of an approximate pre-location of the terminal, said means (29) for estimation of the position of the satellites of said first and second constellations, said means (30) for resolution of the list of satellites visible from the terminal as a function of the approximate pre-location of the terminal that has been determined and the estimated position of the satellites, said means (31) for calculation of the elevation and the azimuth of each satellite from the list of satellites visible from the terminal as a function of the approximate pre-location of the terminal, said means (32) for sorting the satellites from the list of visible satellites, and means (35) for transmission to the terminal of assistance data relating to the list of satellites visible from the terminal, minus the excluded satellites.

9. Method according to claim 1 characterized in that the step (16) of determining an approximate pre-location of the terminal utilizes location information coming from the position of a base station of the cell in which the terminal is situated.

10. Method according to claim 2 characterized in that the step (16) of determining an approximate pre-location of the terminal utilizes either the result of a triangulation within the cellular communication network to deduce the pre-location therefrom, or location information coming from the position of a base station of the cell in which the terminal is situated.

11. Method according to claim 3 characterized in that the step (16) of determining an approximate pre-location of the terminal utilizes either the result of a triangulation within the cellular communication network to deduce the pre-location therefrom, or location information coming from the position of a base station of the cell in which the terminal is situated.

12. A method of management of positioning satellite signals coming from a plurality of constellations for locating a mobile terminal of cellular communication network comprising:

determining an approximate pre-location position of a mobile terminal;

estimating the positions of satellites a plurality constellations;

resolving a list of visible satellites visible from the terminal as a function of the approximate pre-location of the terminal and the estimated positions of the satellites;

calculating the elevation and the azimuth of each of the visible satellites as a function of the approximate pre-location position of the terminal;

forming N groups of satellites belonging to the list of visible satellites, where N corresponds to the number of satellite positioning constellations used in the calculation of the position of the terminal, a group of satellites being defined as belonging to the same constellation;

designating the group having signal characteristics most favorable to positioning performance as constellation 1; and forming a revised list of visible satellites, wherein for each satellite $Sat_i$ of the constellations 2 to N the forming includes:

calculating the angular difference between the azimuth of the satellite $Sat_i$ and the azimuth of all of the satellites of the constellation 1, calculating the angular difference between the elevation of the satellite $Sat_1$; and the elevation of all of the satellites of the constellation 1, and eliminating the satellite $Sat_i$ from the list of visible satellites if the elevation and azimuth angular differences are less than respective threshold values.

13. Method according to claim 12, wherein the determining of the approximate pre-location of the terminal utilizes the result of a triangulation within the cellular communication network.

14. Method according to claim 12, wherein the determining of the approximate pre-location of the terminal utilizes location information coming from the position of a base station of a cell in which the terminal is situated.

15. Method according to claim 12, wherein determining of the approximate pre-location of the terminal utilizes an earlier pre-location of the terminal.

16. Method according to claim 12, further comprising the terminal processing satellite signals from each satellite from the revised list of visible satellites.

* * * * *

UNITED STATES PATENT AND TRADEMARK OFFICE
CERTIFICATE OF CORRECTION

PATENT NO. : 7,646,338 B2
APPLICATION NO. : 11/617072
DATED : January 12, 2010
INVENTOR(S) : Michel Monnerat It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 166 days.

Signed and Sealed this

Twenty-eighth Day of December, 2010

David J. Kappos
*Director of the United States Patent and Trademark Office*